(12) United States Patent
Mankame et al.

(10) Patent No.: US 8,718,813 B2
(45) Date of Patent: May 6, 2014

(54) MECHANICAL IMPLEMENT UTILIZING ACTIVE MATERIAL ACTUATION

(75) Inventors: Nilesh D. Mankame, Ann Arbor, MI (US); Douglas Martin Linn, White Lake, MI (US); James W. Wells, Rochester Hills, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 12/563,245

(22) Filed: Sep. 21, 2009

(65) Prior Publication Data

US 2011/0071670 A1    Mar. 24, 2011

(51) Int. Cl.
*B25J 15/08* (2006.01)
*B25J 15/10* (2006.01)

(52) U.S. Cl.
USPC ............ 700/213; 901/36; 901/40; 394/902; 310/363; 310/311

(58) Field of Classification Search
USPC ......... 700/260, 245, 251, 213; 428/189; 92/2, 92/67, 122; 91/520, 530; 310/528, 12, 310/800, 363, 311, 14; 138/119, 110, 117; 73/862.69; 901/36, 40; 294/902

See application file for complete search history.

(56) References Cited

U.S. PATENT DOCUMENTS

| | | | | |
|---|---|---|---|---|
| 5,126,558 | A * | 6/1992 | Rogers et al. | 250/227.16 |
| 5,136,201 | A * | 8/1992 | Culp | 310/328 |
| 5,396,266 | A * | 3/1995 | Brimhall | 345/161 |
| 5,410,944 | A * | 5/1995 | Cushman | 91/520 |
| 5,662,587 | A * | 9/1997 | Grundfest et al. | 600/114 |
| 5,726,520 | A * | 3/1998 | Grahn | 310/328 |
| 5,973,440 | A * | 10/1999 | Nitzsche et al. | 310/326 |
| 6,012,494 | A * | 1/2000 | Balazs | 138/119 |
| 6,131,436 | A * | 10/2000 | O'Bannon et al. | 73/7 |
| 6,147,422 | A * | 11/2000 | Delson et al. | 310/14 |
| 6,243,624 | B1 * | 6/2001 | Wu et al. | 700/260 |
| 6,307,285 | B1 * | 10/2001 | Delson et al. | 310/14 |
| 6,424,079 | B1 * | 7/2002 | Carroll | 310/339 |
| 6,505,871 | B2 * | 1/2003 | McCormick | 294/119.1 |
| 7,677,118 | B2 * | 3/2010 | Mizuno | 73/862.69 |
| 7,834,527 | B2 * | 11/2010 | Alvarez Icaza Rivera et al. | 310/344 |
| 8,550,519 | B2 * | 10/2013 | Mankame et al. | 294/86.4 |
| 2008/0075930 | A1 * | 3/2008 | Kornbluh et al. | 428/189 |

* cited by examiner

*Primary Examiner* — Ronnie Mancho

(57) ABSTRACT

A mechanical implement adapted for use in an autonomously functioning device, such as a robot arm, and including an active material, such as shape memory polymer, element that when activated and/or deactivated is operable to modify the mechanical impedance of a joint or link in the device.

20 Claims, 8 Drawing Sheets

MECHANICAL IMPLEMENT UTILIZING ACTIVE MATERIAL ACTUATION

BACKGROUND OF THE INVENTION

1. Technical Field

This disclosure generally relates to mechanical joints and links adapted for use in and modifying the stiffness of an autonomously functioning mechanical device, such as a robot arm; and more particularly, to a mechanical implement comprising a joint and/or link that utilizes active material actuation to effect variable impedance and stiffness.

2. Background Art

Mechanical implements comprising joints and links have long been used in mechanical devices to perform various tasks. For example, rotary joints are often used in assembly robots, and links are used to support loads and maintain spatial relations between two joints. Other exemplary applications include toys and rehabilitation aids that interact with humans.

In many applications, such as welding robots, high precision manipulation of work pieces and/or the transfer of large forces by joints or links are required, which may preclude humans from entering the work area due to the high impedance of the joints and/or links. Human-free areas, however, complicate plant design, production, troubleshooting, and maintenance. Variable impedance (e.g., "breakaway") joints and/or links have more recently been developed to better enable interaction with humans and to prevent damage to workpieces or surrounding environments. Similarly, joints and links in toys and rehabilitation aids typically utilize variable impedance to prevent harm to the operator or device during rough handling or unexpected actions by the operator.

One approach to variable impedances in robots, known as active compliance, involves sending sensory feedback to the driving actuator. Concernedly, however, such feedback control typically requires precise timing, complexity (including the injection of extra energy to correct torque/joint force), and additional hardware and software, which present barriers to entry and add significant costs to production. In addition to the bandwidth limitation imposed by the active compliance approach, there is also the danger of unsafe robot-human interaction in the event of controller failure.

Another approach, known as passive compliance, involves using flexible and/or back driveable links or joints. However, these types of approaches also present performance concerns, including those relating to precision, control logic, and structural capacity. Finally, it is also known in the art to combine active and passive compliance in hybrid applications by using, for example, a Series Elastic Actuator. Here, the elastic element limits the high-frequency impedance of the actuator to the stiffness of the elastic coupling; unfortunately, choice of the stiffness of the elastic coupling forces a tradeoff between range of operability and reduction in hazard. Furthermore, to limit the low-frequency impedance, a complex linear feedback system is necessarily implemented to regulate the output force/torque of the actuator-elastic element system.

BRIEF SUMMARY

In response to the afore-mentioned concerns, the invention presents a mechanical implement comprising at least one active material based joint or link. Among other things, the invention is useful for providing high precision and variable impedance when desired. As such, the invention is useful for selectively performing high inertia tasks, and presenting low-impedance secondary dynamics suitable for interacting with humans, preventing damage to the work area due to unintended motion and handling delicate workpieces. The inventive implement is also useful for providing a reconfigurable apparatus that is able to interchange joint and link functionality.

Where the implement presents a joint or link of considerably distinct stiffnesses, the invention is useful for reducing damage or injury caused by collisions. Where the implement alternatively presents a link or joint, or locks in various positions, the invention is useful for performing more versatile tasks. Where the implement presents a sleeve, the invention is useful for retrofitting, improving, and protecting a pre-existing joint. Finally, where the implement presents a flexure or spine, the invention is useful for reducing dynamic imperfections such as axis of rotation drift and strain concentration, thereby improving performance.

Generally, the invention concerns a mechanical implement adapted for use with an autonomously translatable or reconfigurable mechanical device so as to present a first mechanical impedance. The implement includes at least one structural link and/or reconfigurable joint comprising of at least one variable impedance member formed of at least one active material element operable to undergo a reversible change when exposed to an activation signal. A controller is communicatively coupled to the variable member and is operable to selectively cause the element to become exposed to or removed from the signal.

Other aspects and advantages of the present invention will be apparent from the following detailed description of the preferred embodiment(s) and accompanying drawing figures.

BRIEF DESCRIPTION OF THE SEVERAL VIEWS OF THE DRAWING

A preferred embodiment of the invention is described in detail below with references to the attached drawing figures of exemplary scale, wherein.

DETAILED DESCRIPTION

Figure 1:
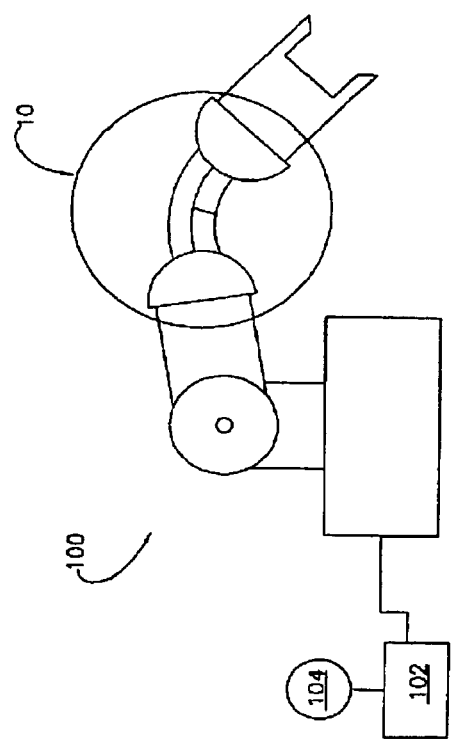
FIG. 1 is an elevation view of a mechanical implement used in an exemplary mechanical device, in this case a robotic arm, and communicatively coupled to a controller and sensor, in accordance with a preferred embodiment of the invention.

The following description of the preferred embodiments is merely exemplary in nature and is in no way intended to limit the invention, its application, or uses. In general, the present invention concerns a variably compliant mechanical implement 10 adapted for use with an autonomously functioning mechanical device 100, such as a robot, toy, or rehabilitation aid. The inventive implement 10 is suitable for use in a variety of applications; including, for example, as joints requiring variable stiffness (FIGS. 2-4b), as sleeves upgrading low stiffness joints to presenting variable stiffness control (FIG. 5), or as mechanical members alternating between link and joint functionality (FIG. 6).

The implement 10 includes a variable impedance member 12 composing or effecting a joint or link that utilizes the advantages of active material actuation to alter the stiffness of the joint and/or link. Accordingly, the implement 10 can be used as a stiff joint (or link) in a robot or similar device to allow precise motions and high payload capacity, or as a compliant joint (or link) for benign interaction with humans. Whether used as links and/or joints, the variable impedance member 12 provides means to overcome the safety versus performance tradeoff previously mentioned. The variable impedance member 12 can be used in a straightforward manner when the workspace can be neatly partitioned into distinct regions, including those that require high stiffness joints and are free of humans, and others that are shared with humans and hence require compliant joints. Many common industrial tasks have this characteristic, e.g. a welding robot needing high stiffness when performing the welding operation, and a much lower stiffness when moving between work stations.

As used herein, the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness, modulus, shape and/or dimensions in response to the activation signal.

Depending on the particular active material, the activation signal can take the form of, without limitation, an electric current, an electric field (voltage), a temperature change, a magnetic field, a mechanical loading or stressing, and the like. For example, a magnetic field may be applied for changing the property of the active material fabricated from magnetostrictive materials. A heat signal may be applied for changing the property of thermally activated active materials such as shape memory polymer (SMP). An electrical signal may be applied for changing the property of the active material fabricated from electroactive materials, piezoelectrics, and/or ionic polymer metal composite materials.

Exemplary embodiments of the invention are described and illustrated herein, with respect to SMP; however, it is appreciated that other active materials, such as, but not limited to, shape memory alloys (SMA), magneto-rheological material (MR), electro-rheological material (ER), and ferromagnetic shape memory alloys (FSMA) may be suitable for use.

More particularly, shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. After processing the material at the transition temperature of the soft segment, the temporary shape is set by cooling the material. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when un-activated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components for forming a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

As previously mentioned, the active material element 14 typically comprises SMP, however, it is appreciated that other equivalently performing active materials, such as a shape memory alloy (SMA), a magneto-rheological (MR) material, an electro-rheological (ER) material or a combination thereof can be used. Various signals may be used to trigger the change in fundamental property (e.g., elastic modulus, stiffness), including heat, light, pH, and humidity. With respect to SMP, the variable impedance member 12 is preferably configured such that the implement 10 presents a damping and/or locking mechanism. It is appreciated that thermally activated SMPs exhibit a much higher (e.g. 5×) damping ability at temperatures above $T_s$ than conventional elastomers (e.g., rubber). It is appreciated that where SMP is utilized, joint locking can be obtained without additional expenditure of energy (i.e., a zero-power hold) and without bulky brake/detent systems. This is particularly useful in robotic wrists.

In some embodiments, the change occurs preferably over a small difference in the value of the controlling stimulus and secondarily a small/minimum period, so as to effect generally binary (or "sharp") functional stiffnesses, in which case the stiffness may be high or low. In other embodiments, the change occurs over a larger difference and period, so as to effect a gradual plurality of functional stiffnesses. Here, the stiffness can be varied continuously (though not necessarily linearly) with the level/amplitude of the signal. The mechanical implement 10 generally presents a link or a joint, but in one preferred embodiment the change causes the implement 10 to alternatively present a link or joint, which is particularly useful in robotic arms.

The total stiffness of all variable impedance members 12 ($k_{tL\ VS}$) in their low stiffness state should be substantially (e.g., 25%, more preferably 50%, and most preferably 75%) less than the total stiffness of all fixed impedance members 22 ($k_{t\ FS}$). When all of the variable impedance members 12 are in the low stiffness state, the stiffness of the fixed impedance members 22 dominates the stiffness contribution from the variable impedance member 12. The number, materials, shape and size of the fixed impedance members 22 are chosen such that ($k_{t\ FS}+k_{tL\ VS}$) is the lowest desired stiffness of the implement 10. The total stiffness of all variable impedance members 12 in the high stiffness state ($k_{tH\ VS}$) is substantially (e.g., 25%, more preferably 50%, and most preferably 75%) greater than ($k_{t\ FS}$). In this condition, the variable impedance members 12 control the overall stiffness of the implement 10. The number, materials, shape and size of the variable impedance members 12 are chosen such that ($k_{t\ FS}+k_{tH\ VS}$) is the highest desired stiffness of the implement 10. Intermediate stiffnesses can be attained by switching a subset of the variable impedance members 12 to their low stiffness state (for binary stiffness members 12), or by switching their stiffnesses only partially (for gradually varying members 12). Intermediate stiffnesses can also be accomplished by using variable impedance members 12 that comprise sub-elements with different activation stimulus levels.

As an example, the variable impedance members 12 may be a laminate formed from SMPs with different transition temperatures ($T_1<T_2$). As such, when the variable impedance member 12 temperature is T ($T<T_1<T_2$) both SMPs are in their high stiffness states; when the temperature is T ($T_1<T<T_2$), the $SMP_1$ is in the low stiffness state and $SMP_2$ is in the high stiffness state; and finally, when the temperature is T ($T_1<T_2<T$) both SMPs are in the low stiffness states. The volume and distribution of the active material should be such that there is enough material to produce the desired variation in stiffness (i.e. from ($k_{tL\ VS}$) to ($k_{tH\ VS}$)), but not too much to avoid low operating frequencies due to latencies in the activation/de-activation processes.

It is appreciated that the default (i.e. un-activated) state of the SMP-based members 12 is the high stiffness state, whereas it is the low stiffness state for other active materials. A biasing stimulus or otherwise mechanism/material composition may be used to invert this relationship. Some examples of such inversions are: a member 12 that uses an SMP whose $T_s$ is below the normal operating temperature, such that the SMP is in the low stiffness state by default, but switches to a high stiffness state when it is cooled to below $T_s$; a member 12 that uses an MR elastomer that is under the influence of a permanent magnetic field such that the high stiffness state is presented until a solenoid-induced field is used to cancel the magnetic field and revert the MR member 12 to the low stiffness state.

A plurality of exemplary configurations is provided. FIG. 1. shows a mechanical implement 10 incorporated into a mechanical device 100, in this case a robotic arm. The mechanical device is further shown communicatively coupled to a controller 102 and sensor 104, and together the sensor 104 and controller 102 are operable to selectively activate the active material (e.g., where a collision is detect), so as to effect the intended functions of the invention. The invention can be used in numerous variations and industrial equipment, and in other exemplary applications such as linkage systems, interactive toys, and rehabilitation aids.

Figure 2:
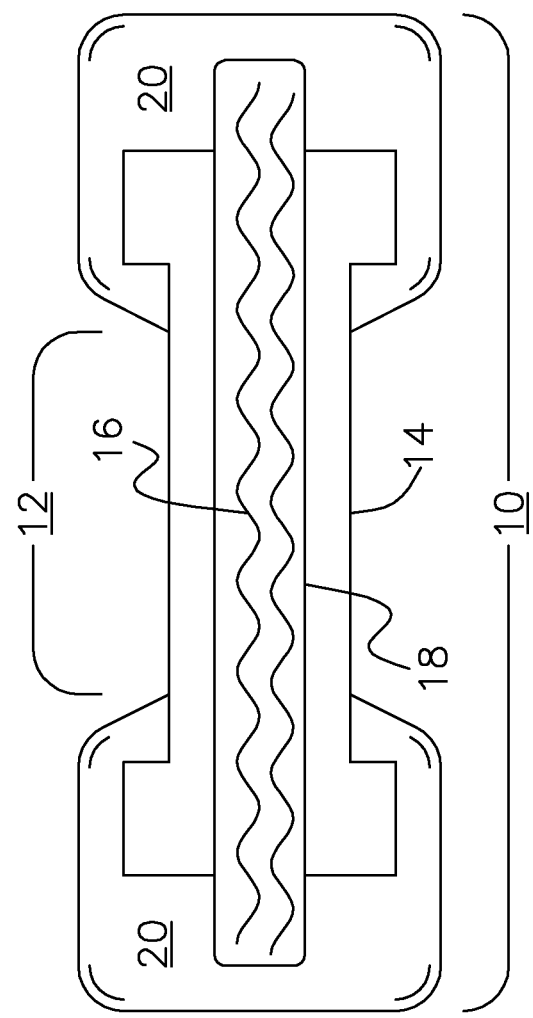
FIG. 2 is an elevation view of a joint or link comprising a variable impedance member including an active material element in the form of a thermally activated SMP, an activator in the form of an embedded resistive heater, and fixed stiffness end connections; in accordance with a preferred embodiment of the invention.

FIG. 2 shows a preferred basic embodiment of a variable stiffness implement 10 comprising only a variable impedance member 12 with an activator 18. The fixed stiffness end-connections 20 may or may not be a part of the implement 10. As an example, the variable impedance member 12 comprises a thermally activated SMP, whose ($T_s$) is above the normal operating temperature, and the activator 18 is an embedded resistive heater. This implement can be used as a variable stiffness joint or link. When the activator 18 is off, the variable impedance member 12 is in its stiff state and the overall stiffness of the implement is high. When the activator 18 is turned on, the SMP is heated and its elastic modulus begins to drop in the vicinity of $T_s$.

The transition to its low modulus (and hence, low stiffness) state is completed at some temperature $T_H>T_s$. In this state, the stiffness of the implement 10 is low. When the activator is turned off again, the SMP cools down and regains its modulus. At some temperature ($T_L < T_s$), the SMP recovers its high elastic modulus completely. If the cooling is done while the implement 10 is in a deformed state, that deformation is locked in and retained after the SMP recovers its high modulus state. Reheating the element to $T > T_s$ in the absence of any deformation/loads restores the original or un-deformed shape of the implement 10. Thus, when the implement is used as a variable stiffness joint, the joint can be locked in any position without expending additional energy (i.e. zero power hold). A protective cover (not shown) may be used to avoid exposure of the implement to the environment.

Figure 3A:
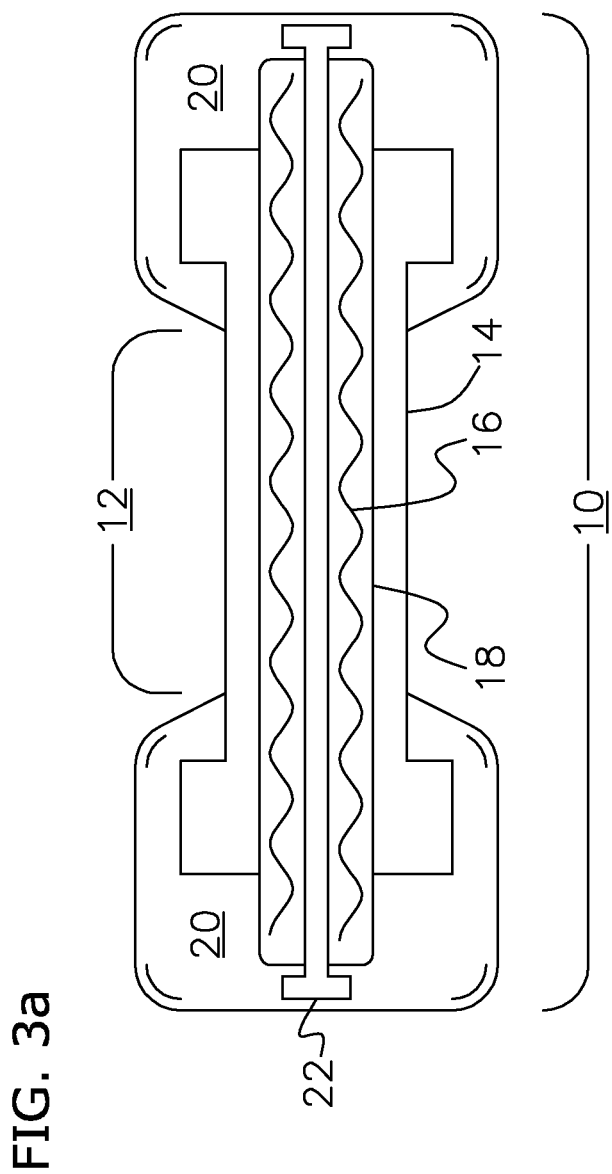
FIG. 3a is an elevation view of the joint or link shown in FIG. 1, further comprising a fixed impedance member, preferably a spine made of spring steel or hard polymer, concentrically aligned and mechanically parallel with the variable impedance member, in accordance with a preferred embodiment of the invention.

FIG. 3a shows another preferred embodiment, as an extension of the embodiment shown in FIG. 2. This embodiment comprises a fixed impedance member 22, preferably a flexure made of spring steel or hard polymer, optional fixed stiffness end-connections 20, a variable impedance member 12, and an activator 18. This embodiment may be preferred over that in FIG. 2 in cases where a higher value of ($k_{tL\ VS}$) is desired or when a higher restoring force is needed to enable the implement 10 to recover its un-deformed state. A protective cover (not shown) may be used to avoid exposure of the implement to the environment.

Figure 3B:
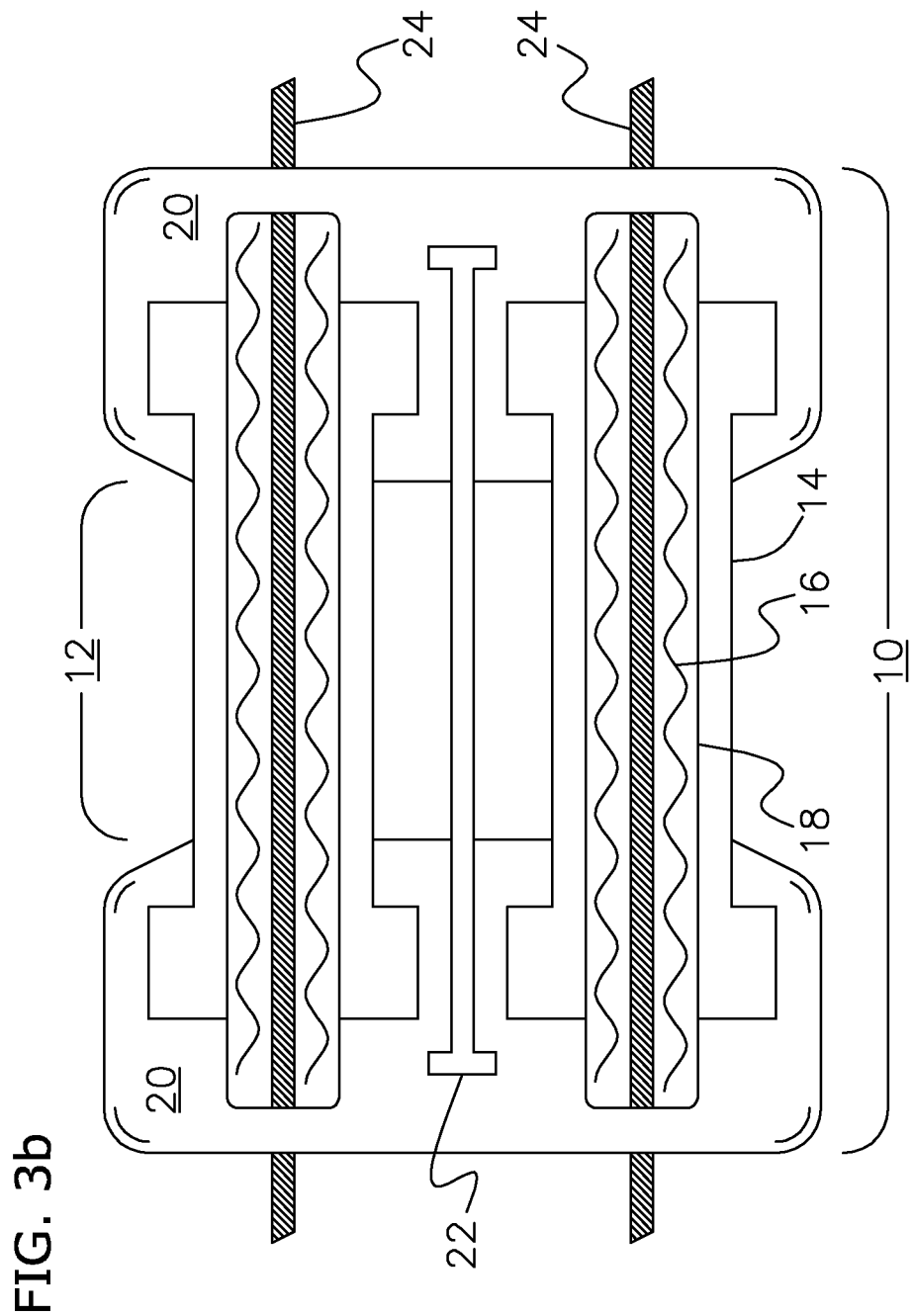
FIG. 3b is an elevation view of the joint or link shown in FIG. 3a, depicting an additional variable impedance member and activator, and antagonistic tendons (low stiffness actuators) to drive the implement, in accordance with a preferred embodiment of the invention.

FIG. 3b shows a more advanced preferred embodiment with rearranged components from the embodiment shown in FIG. 3a. Two variable impedance members 12 and a fixed impedance member 22 are placed mechanically in parallel between two fixed stiffness end-connections 20. Laterally antagonistic low stiffness actuators 24, preferably composed of active material, provide a low-stiffness actuation system to drive the implement 10. This embodiment can be used as a link, but is preferred to be used as a joint. Alternatively, to effect vertically antagonistic actuation, the actuators 24 may be configured to pass over and under the element 12, such that respective activation and contraction causes vertical bending. This concept can be generalized to various numbers and arrangements of variable and fixed stiffness elements. A protective cover (not shown) may be used to avoid exposure of the implement to the environment.

Figure 4A:
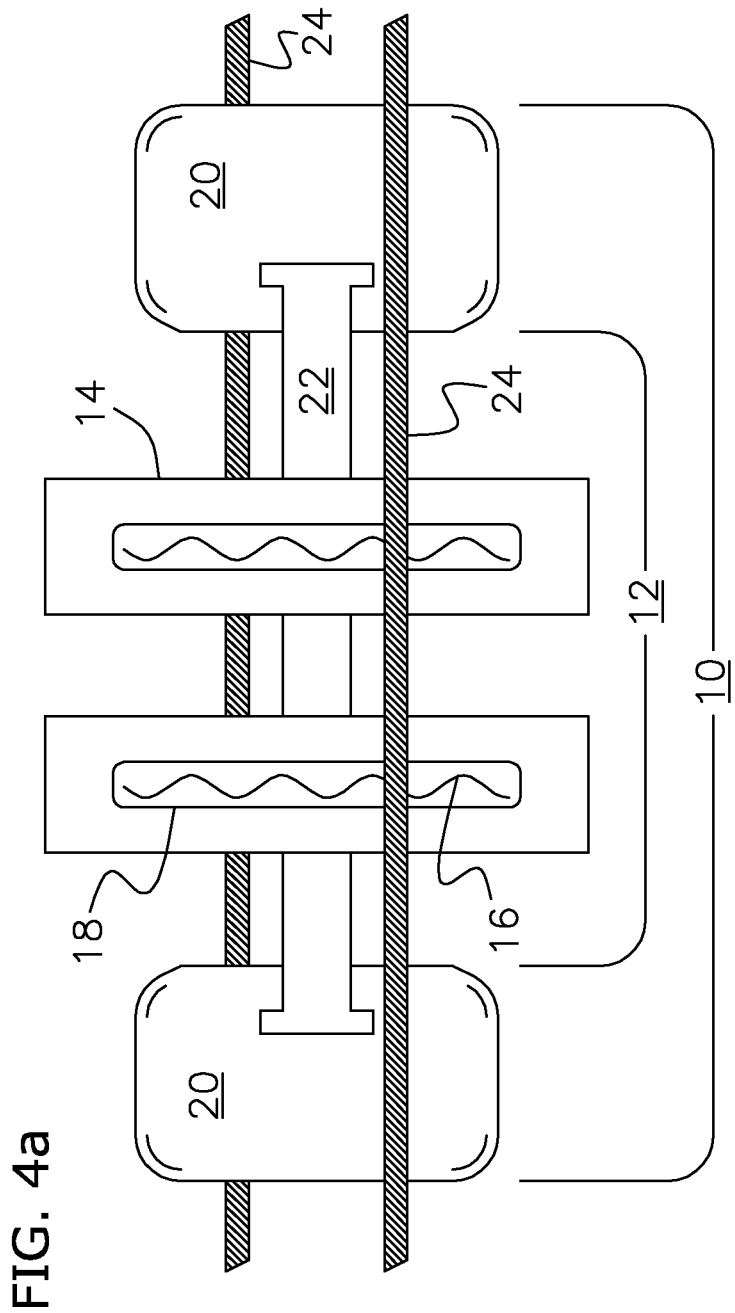
FIG. 4a is an elevation view of the joint or link shown in FIG. 3b, wherein the active material elements are inter-engaged and angularly oriented in relation to the fixed impedance member, in accordance with a preferred embodiment of the invention.

Configurations such as those shown in FIGS. 3a,b present two issues: 1) drift of axis of rotation, and 2) high strain concentration near the fixed stiffness end-connections 20. FIG. 4a shows a preferred distribution of the active material elements 14 relative to the fixed impedance member 22, which helps control the drift of the axis of rotation, the effective stiffness of the connection and ensures a more uniform distribution of the deformation strain energy in the fixed impedance member 22. The active material elements 14 and fixed impedance member 22 are inter-engaged and angularly oriented with respect to each other and configured to cooperatively modify the free-span (not shown) of the fixed impedance member 22. When both of the active material elements 14 are in their low stiffness state, the free-span presents a maximum length, but when both of the active material elements 14 are in their high stiffness state, the free-span length decreases.

Thus, the stiffness of the implement 10 can be controlled by varying the stiffness of the active material elements 14, correcting or controlling the mode of deformation of the fixed impedance member 22, and thereby alleviating the above problems. The effective span of the member 22 can also be controlled by adjusting the position of the elements 14 relative thereto. This may be achieved, e.g., by heating the elements 14 to above $T_s$, deforming the elements to allow them to move relative to the member 22, moving the elements 14 to a new position relative to the member 22, deforming the elements 14 to lock them to the member 22 and cooling the elements 14 back below $T_s$ to set them in the new position. The number and arrangement of the various components can be changed to suit the application. A protective cover (not shown) may be used to avoid exposure of the implement to the environment.

Figure 4B:
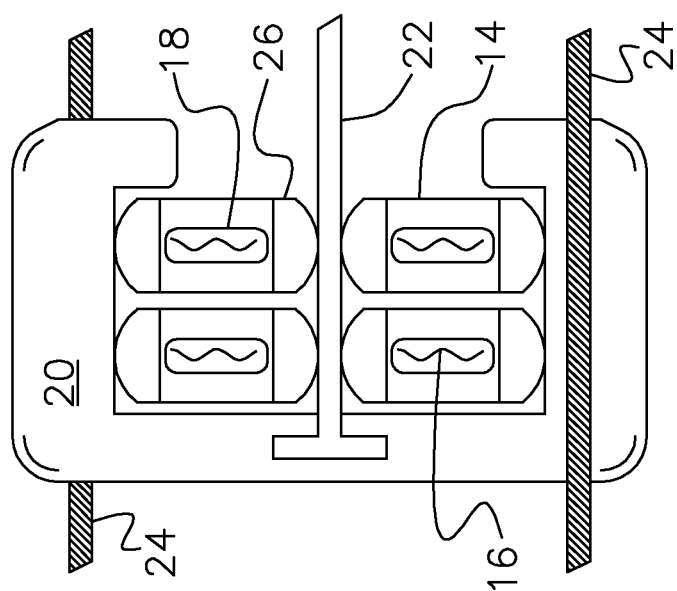
FIG. 4b is an elevation view of one end of a variable stiffness joint comprising a fixed stiffness spine, and active material elements and activators distributed within a fixed, stiffness casing and between fixed stiffness endcaps to engage the spine, in accordance with a preferred embodiment of the invention.

FIG. 4b shows one half of a symmetric, preferred implementation of the concept in FIG. 4a. The active material elements 14 are distributed within fixed stiffness endcaps 26 which protect the active material elements 14 from scuffing and other contact-induced wear mechanisms. Active material elements 14 are embedded with activators 18, preferably resistive heaters, and together with the fixed impedance member 22 they form a variable impedance member 12. When all of the active material elements 14 are in a low stiffness state, the effective free-span (not shown) of the fixed impedance member 22 is longest and the implement 10 as a whole has a minimum stiffness. When all of the active material elements 14 are in a high stiffness state, the free-span is shortest and the implement 10 has a maximum stiffness. Finally, when the active material elements 14 are in a combination of high and low stiffness states, the free-span length and implement 10 stiffness exhibit intermediate values. The number and arrangement of the various components can be changed to suit the application. A protective cover (not shown) may be used to avoid exposure of the implement to the environment.

Figure 5:
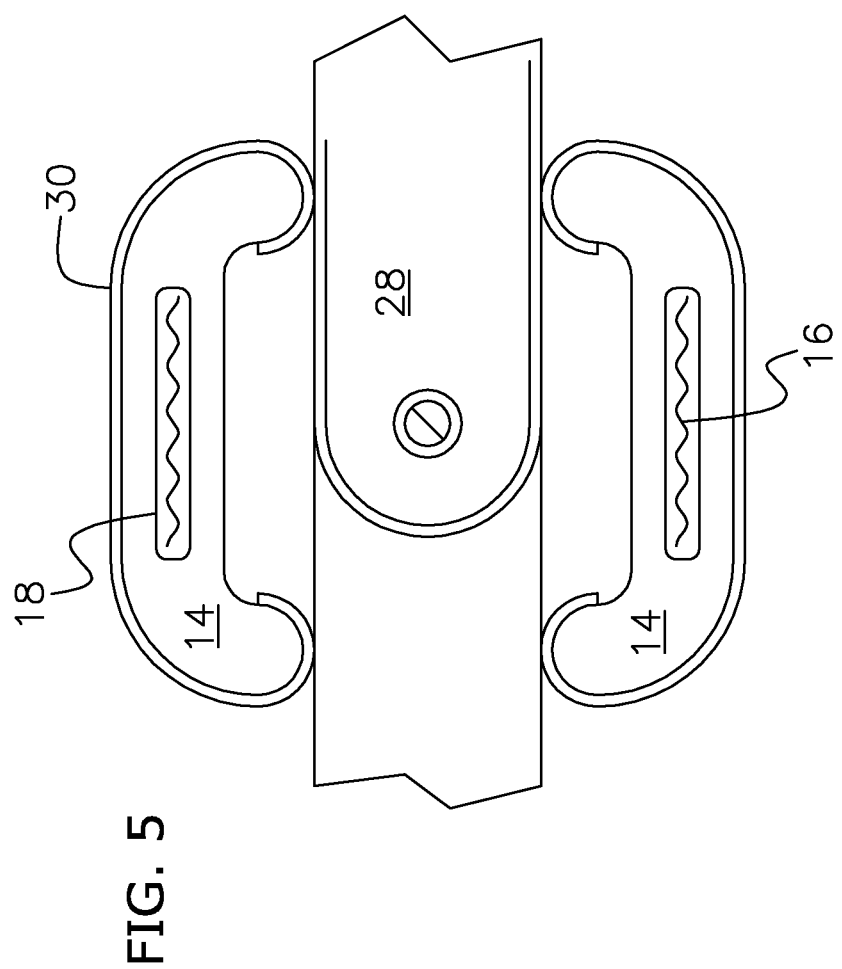
FIG. 5 is an elevation view of a low-stiffness joint retrofitted with a sleeve comprising an active material element in the form of a thermally active SMP, an activator in the form of an embedded resistive heater, and a fixed stiffness casing enclosing the active material element, in accordance with a preferred embodiment of the invention.
Figure 6:
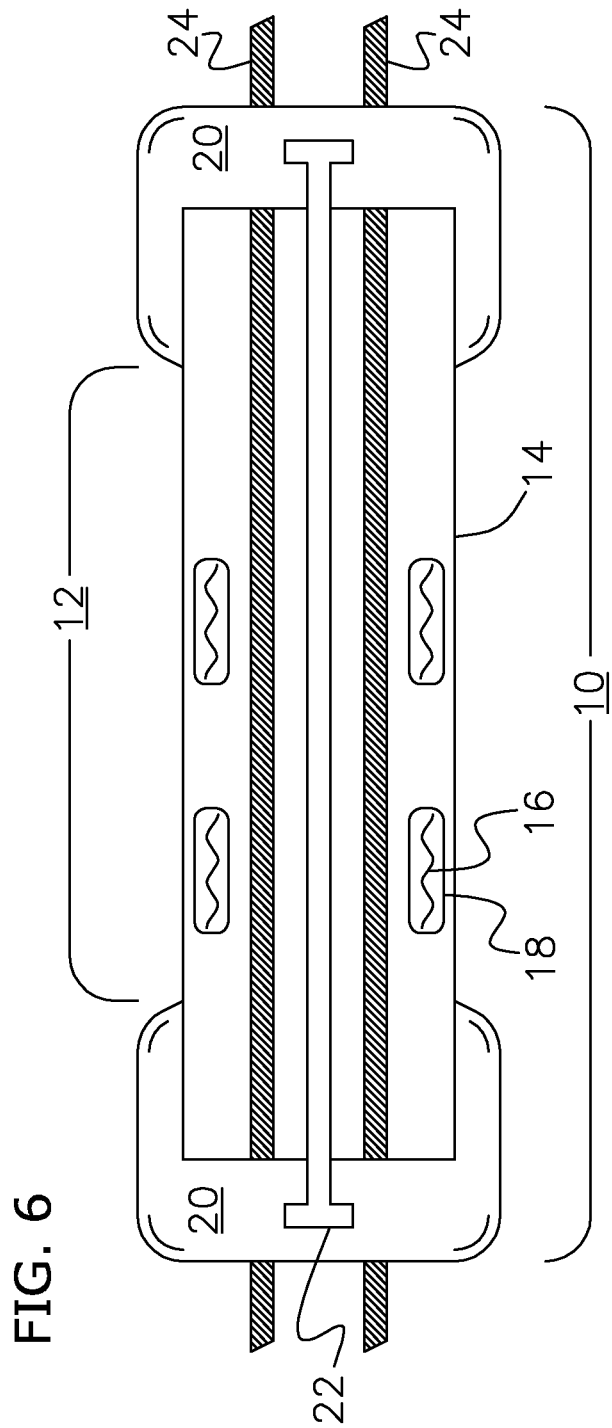
FIG. 6 is an elevation view of a mechanical implement comprising a variable impedance member embedded with activators in discrete sections, a fixed impedance member mechanically parallel with the variable impedance member, antagonistic tendons to drive the implement, and fixed stiffness end connections, in accordance with a preferred embodiment of the invention.

FIG. 5 shows a preferred adaptation of the most basic embodiment, for retrofitting a previously existing low stiffness joint 28 to exhibit a variable stiffness capability, in which the variable impedance member 12 is formed into a sleeve fitted over the low stiffness joint 28. An optional fixed stiffness casing 30 enclosing the active material element 14 provides a restoring force and serves to protect the variable impedance member 12 from the environment. An activator 18 controls the stiffness of the variable member 12, and therefore the existing joint 28, by applying preferably varying levels of a signal 16. The range of motion of the low stiffness joint 28 can be controlled by selectively activating and deactivating different parts of the variable impedance member 12. The low stiffness joint 28 can thus be locked in many configurations.

Finally, FIG. 6 shows another adaptation, preferred for applications in which the implement 10 is intended to be used as either a joint or a link. Here the structure of a mechanical device 100, preferably a robot arm, can be altered by changing the status of discrete regions of the variable impedance member 12. Activators 18 are embedded in the active material element 14 that forms the bulk of the device 100 (FIG. 1). A fixed impedance member 22 and low-stiffness actuator 24 are also embedded in the active material element 14. The regions not embedded with activators 18 have a fixed stiffness, and serve as rigid links. The regions embedded with activators 18 (variable regions) may be independently activated and deactivated, rising and falling above and below $T_s$, and thus independently functioning as rigid links and flexible hinges.

In a preferred embodiment, the variable impedance member 12 is a thermally activated SMP with a $T_s$ greater than the operating temperature of the environment. The default (unactivated) stiffness of the active material element 14 is high; as such, these regions serve as relatively rigid links of the robot arm. With a proper selection of material, geometry and design of the implement 10, the bending stiffness of variable regions in this state can be made to be considerably larger than its value in the activated state. A large number of variations in the structure of the implement 10 are made possible if a number of activators 18 are distributed in the device 100. A protective cover (not shown) may be used to enclose and protect the various elements of this arm.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g. ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g. the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A mechanical implement adapted for use with an autonomously moveable or reconfigurable mechanical device, presenting a variable mechanical impedance, and including at least one structural link and/or reconfigurable joint, said implement comprising:
   at least one variable impedance member composing the link and/or joint, and including at least one active material element operable to undergo a reversible change when subjected to or removed from an activation signal, so as to be activated and deactivated respectively,
   wherein said at least one variable impedance member defines total low and high variable stiffnesses, when activated and deactivated respectively, and the change is operable to vary the impedance; and
   at least one controller communicatively coupled to said at least one variable impedance member, and operable to selectively cause the element to become exposed to or removed from the signal.

2. The implement in claim 1, wherein the change occurs over a small difference in the value of the controlling stimulus, so as to effect generally binary functional stiffnesses.

3. The implement in claim 1, wherein the change occurs over a larger difference in the value of the controlling stimulus, so as to effect a plurality of functional stiffness.

4. The implement in claim 1, wherein said at least one stiffness member presents an initial geometry, the change is operable to modify the stiffness, so as to result in a second stiffness, modification to the second stiffness enables the stiffness member to take on a second geometry, and reversal of the change causes the element to be locked in the second geometry.

5. The implement in claim 1, wherein the change causes the implement to alternatively present a link or joint.

6. The implement in claim 1, wherein the device presents a robot arm, mechanism, toy, or rehabilitation aid.

7. The implement in claim 1, wherein the device is pre-existing and includes at least one low stiffness joint presenting the stiffness, and the implement presents a sleeve operable to overlay and retrofit the joint.

8. The implement in claim 1, wherein the member and controller are cooperatively configured to vary the modification in stiffness by varying the signal, activating differing subsets of a plurality of identical active material elements, or activating differing subsets of a plurality of differing active material elements.

9. The implement in claim 1, wherein the device further includes a low stiffness active material actuator selected from the group consisting essentially of cables, pre-strained shape memory alloy wires, or electro-active polymer actuators embedded or running through dedicated channels in the implement.

10. The implement in claim 1, wherein the device is actuated by a control signal, and the control and activation signals are distinct.

11. The implement in claim 10, further comprising:
    a sensor communicatively coupled to the controller and operable to detect a collision, state of the environment of the implement or other condition relevant to the operation of the implement,
    said controller being programmably configured to cause the change, when the collision, state of the environment or condition is detected or inferred or anticipated via a control logic programmed into the controller.

12. The implement in claim 1, wherein the element comprises an active material selected from the group consisting essentially of shape memory polymers, shape memory alloys, ferromagnetic shape memory alloys, magnetorheological elastomers, and electrorheological elastomers.

13. The implement in claim 12, wherein the element is formed of shape memory polymer and the member is configured such that the implement presents a damping and/or locking mechanism within the device.

14. The implement in claim 12, wherein the member includes a laminate formed from first and second shape memory polymer elements presenting differing transition temperatures.

15. The implement in claim 1, further comprising:
    at least one fixed impedance member mechanically parallel with said at least one variable impedance member, wherein the fixed impedance member presents a total fixed stiffness.

16. The implement in claim 15, wherein said at least one fixed impedance member presents a flexure comprising spring steel or hard polymer.

17. The implement in claim 15, wherein the total low variable stiffness is considerably less than and the total high variable stiffness is considerably greater than the total fixed stiffness.

18. The implement in claim 15, wherein each of said at least one variable impedance member presents an elongated geometric shape, said at least one fixed impedance member presents a spine having a flexure span length, and the spine and variable members are inter-engaged and angularly oriented relative to each other, such that the spine and the stiffness and/or position of the variable members are cooperatively configured to modify the span based on the change.

19. The implement in claim 18, wherein at least one variable impedance member composes a casing, the casing further includes fixed stiffness end caps distally engaging, so as to confine, said at least one variable member and a fixed stiffness element, and at least one set of casings is configured to oppositely engage the spine.

20. A robotic arm presenting an engagement point and mechanical impedance:
   wherein the arm
      is drivenly coupled to an actuator operable to cause the point to translate to a location within a precise geometric tolerance, and
      includes an active material operable to undergo a change in fundamental property when exposed to or removed from an activation signal, so as to present activated and deactivated states respectively,
   wherein the mechanical impedance presents a first value and the geometric tolerance presents a first range when the material is caused to achieve one of said activated and deactivated states and a second value less than the first value and a second range greater than the first range when caused to achieve the other of said activated and deactivated states.

* * * * *